(12) United States Patent
Lee et al.

(10) Patent No.: US 12,431,993 B2
(45) Date of Patent: Sep. 30, 2025

(54) COMMUNICATION METHOD AND DEVICE IN WIRELESS COMMUNICATION SYSTEM HAVING CROSS-LINK INTERFERENCE

(71) Applicant: Samsung Electronics Co., Ltd., Suwon-si (KR)

(72) Inventors: Kwonjong Lee, Suwon-si (KR); Gibum Kim, Suwon-si (KR); Sundo Kim, Suwon-si (KR); Donghun Lee, Suwon-si (KR); Sangwon Jung, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 18/170,896

(22) Filed: Feb. 17, 2023

(65) Prior Publication Data
US 2024/0243824 A1   Jul. 18, 2024

(30) Foreign Application Priority Data
Jan. 18, 2023   (KR) .................. 10-2023-0007302

(51) Int. Cl.
*H04B 17/345*   (2015.01)
*H04W 24/10*   (2009.01)
*H04W 52/52*   (2009.01)

(52) U.S. Cl.
CPC .......... *H04B 17/345* (2015.01); *H04W 24/10* (2013.01); *H04W 52/52* (2013.01)

(58) Field of Classification Search
CPC .... H04B 17/345; H04W 24/10; H04W 52/52; H04W 52/243
See application file for complete search history.

(56) References Cited

U.S. PATENT DOCUMENTS

2020/0275298 A1   8/2020   Xu et al.
2021/0144577 A1*  5/2021   Zhu .................. H04B 17/24
(Continued)

FOREIGN PATENT DOCUMENTS

WO   2021/138827 A1   7/2021
WO   2022/054968 A1   3/2022

OTHER PUBLICATIONS

New H3C, Study on potential enhancement on dynamic/flexible TDD, R1-2211039, 3GPP TSG RAN WG1 Meeting #111, Toulouse, Nov. 4, 2022.

(Continued)

*Primary Examiner* — Ayodeji O Ayotunde
(74) *Attorney, Agent, or Firm* — Jefferson IP Law, LLP

(57) ABSTRACT

The disclosure relates to a 5th-generation (5G) or 6th-generation (6G) communication system for supporting a higher data transmission rate. A method performed by a first user equipment (UE) in a wireless communication system in which cross-link interference (CLI) exists is provided. The method includes receiving, from a base station, control information related to automatic gain control (AGC) tuning and CLI measurement, receiving, from a second UE, a first signal for the AGC tuning based on the control information, controlling an input signal level of an analog-to-digital converter (ADC) in the first UE based on the first signal, receiving, from the second UE, a second signal for the CLI measurement based on the control information, and transmitting, to the base station, a report message including a CLI measurement result measured based on the second signal.

20 Claims, 15 Drawing Sheets

(56) References Cited

U.S. PATENT DOCUMENTS

2022/0329462 A1   10/2022  Kang et al.
2024/0056863 A1*  2/2024  Ibrahim ................ H04W 24/10
2024/0114449 A1*  4/2024  Elshafie ............ H04W 52/0225

OTHER PUBLICATIONS

Lenovo, Potential enhancements on dynamic/flexible TDD, R1-2211570, 3GPP TSG RAN WG1 Meeting #111, Toulouse, Nov. 7, 2022.
KDDI Corporation, Discussion on subband non-overlapping full duplex, R1-2212289, 3GPP TSG RAN WG1 Meeting #111, Toulouse, Nov. 7, 2022.
InterDigital, Inc., Discussion on potential enhancements on dynamic/flexible TDD, R1-2211738, 3GPP TSG RAN WG1 Meeting #111, Toulouse, Nov. 7, 2022.
International Search Report and Written Opinion dated Oct. 6, 2023, issued in International Patent Application No. PCT/KR2023/002360.

* cited by examiner

COMMUNICATION METHOD AND DEVICE IN WIRELESS COMMUNICATION SYSTEM HAVING CROSS-LINK INTERFERENCE

CROSS-REFERENCE TO RELATED APPLICATION(S)

This application is based on and claims priority under 35 U.S.C. § 119(a) of a Korean patent application number 10-2023-0007302, filed on Jan. 18, 2023, in the Korean Intellectual Property Office, the disclosure of which is incorporated by reference herein in its entirety.

BACKGROUND

1. Field

The disclosure relates to a method and device for communication in a wireless communication system in which cross-link interference (CLI) exists.

2. Description of Related Art

Wireless communication technologies have been developed mainly for human services, such as voice, multimedia, and data communication. As 5th-generation (5G) communication systems are commercially available, the number of connected devices are expected to explosively increase and to be connected to communication networks. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (usec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz (THz) bands (e.g., 95 gigahertz (95 GHZ) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the user equipment (UE) computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for stable communication in a wireless communication system in which cross-link interference (CLI) exists.

Another aspect of the disclosure is to provide a method and device for efficiently preventing analog-to-digital converter (ADC) saturation in a user equipment (UE) in a wireless communication system in which CLI exists.

Another aspect of the disclosure is to provide a cross-link interference-reference signal (CLI-RS) resource allocation method and device for preventing ADC saturation in a wireless communication system in which CLI exists.

Another aspect of the disclosure is to provide a method and device for CLI measurement reporting in a wireless communication system in which CLI exists.

Additional aspects will be set forth in part in the description which follows and, in part, will be apparent from the description, or may be learned by practice of the presented embodiments.

In accordance with an aspect of the disclosure, a method performed by a first UE in a wireless communication system in which cross-link interference (CLI) exists is provided. The method includes receiving, from a base station, control information related to automatic gain control (AGC) tuning and CLI measurement, receiving, from a second UE, a first signal for the AGC tuning based on the control information, controlling an input signal level of an analog-to-digital converter (ADC) in the first UE based on the first signal, receiving, from the second UE, a second signal for the CLI measurement based on the control information, and transmitting, to the base station, a report message including a CLI measurement result measured based on the second signal.

In accordance with another aspect of the disclosure, a first UE in which CLI exists is provided. The first UE includes a transceiver and at least one processor configured to receive, via the transceiver from a base station, control information related to AGC tuning and CLI measurement, receive, via the transceiver from a second UE, a first signal for the AGC tuning based on the control information, control an input signal level of an ADC in the first UE based on the first signal, receive, via the transceiver from the second UE, a second signal for the CLI measurement based on the control information, and transmit, to the base station via the transceiver, a report message including a CLI measurement result measured based on the second signal.

In accordance with another aspect of the disclosure, a method performed by a base station in a wireless communication system in which CLI exists is provided. The method includes transmitting, to a first UE, first control information related to at least one of AGC tuning or CLI measurement, transmitting, to a second UE, second control information related to transmission of at least one of a first signal for the AGC tuning or a second signal for the CLI measurement, and receiving, from the first UE, a report message including a CLI measurement result based on the second signal.

In accordance with another aspect of the disclosure, a base station in a wireless communication system in which CLI exists is provided. The base station includes a transceiver and at least one processor configured to transmit, to a first UE via the transceiver, first control information related to at least one of AGC tuning or CLI measurement, transmit, to a second UE via the transceiver, second control information related to transmission of at least one of a first signal for the AGC tuning or a second signal for the CLI measurement, and receive, via the transceiver from the first UE, a report message including a CLI measurement result based on the second signal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
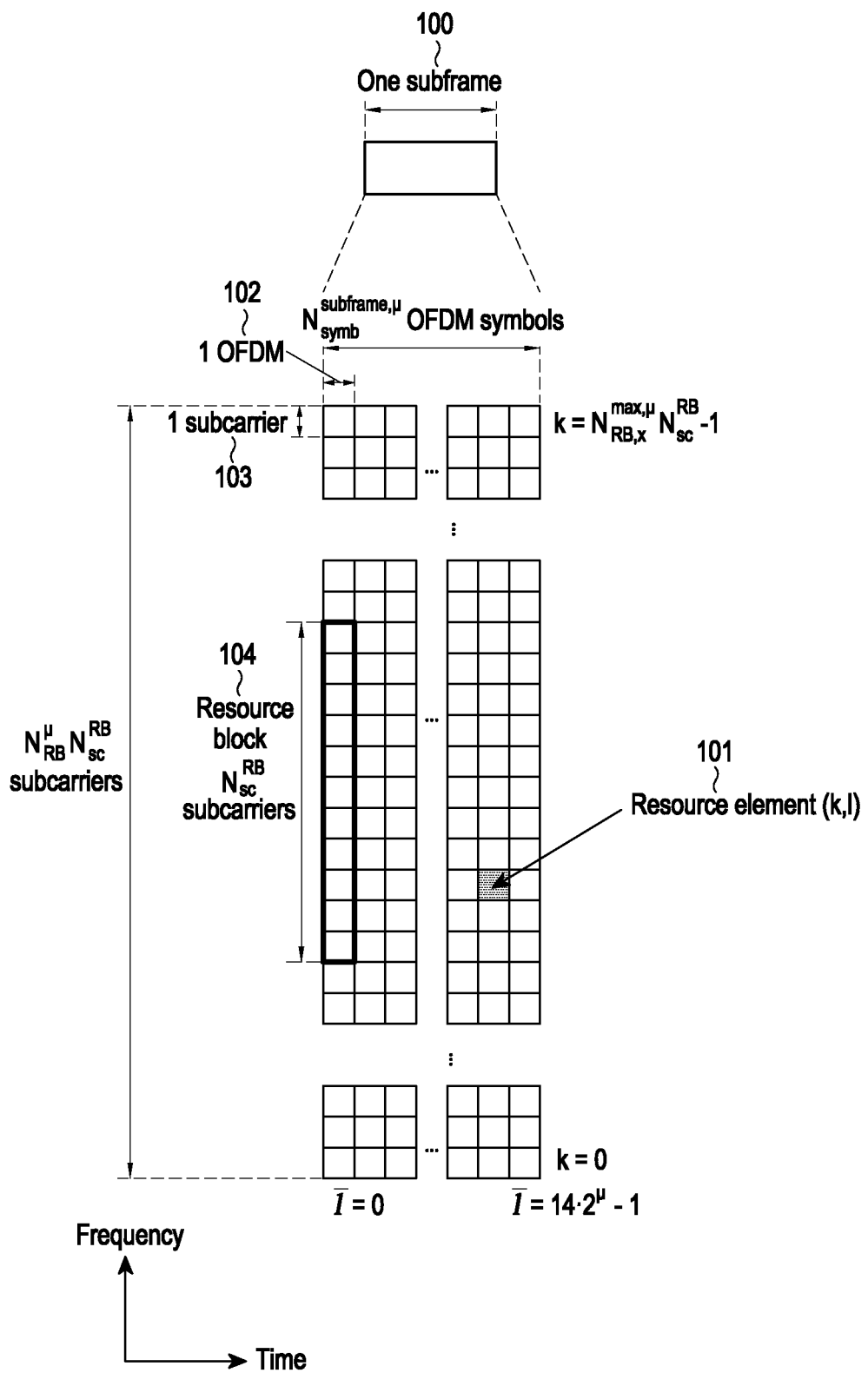
FIG. 1A is a view illustrating a basic structure of a time-frequency domain, which is a radio resource region in which data or control channels are transmitted in a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

As used herein, each of such phrases as "A and/or B", "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure. Hereinafter, the base station may be an entity allocating resource to the UE and may be at least one of gNode B, eNode B, Node B, base station (BS), wireless access unit, base station controller, or node over network. The base station may be a network entity including at least one of an integrated access and backhauldonor (IAB-donor), which is a gNB providing network access to UE(s) through a network of backhaul and access links in the 5G system, and an IAB-node, which is a radio access network (RAN) node supporting new radio (NR) backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link. The user equipment (UE) may include a terminal, mobile station (MS), cellular phone, smartphone, computer, or a multimedia system capable of performing communication functions. Of course, it is not limited to the above examples.

For ease of description, hereinafter, some of the terms and names defined in the 3rd generation partnership project long term evolution (3GPP LTE) or 3GPP new radio (NR) standards may be used. However, the disclosure is not limited by such terms and names and may be likewise applicable to systems conforming to other standards.

Post-LTE, next-generation communication systems, for example, NR systems, that is, 5G systems, are required to freely reflect various needs of users and service providers and thus to support services that meet various requirements. Services considered for 5G systems include, for example, increased mobile broadband (eMBB), massive machine type communication (MMTC), and ultra-reliability low latency communication (URLLC).

Although 5G system is described in connection with embodiments of the disclosure, as an example, embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

In the disclosure, information transmitted/received between the base station and the UE may be transferred by at least one of higher layer signaling and layer 1 (L1) signaling.

Higher layer signaling may be signaling corresponding to at least one or a combination of one or more of the following signaling.
Master information block (MIB)
System information block (SIB) or SIB X (X=1, 2, . . . )
Radio resource control (RRC)
Medium access control (MAC) control element (CE)

Further, L1 signaling may be signaling corresponding to at least one or a combination of one or more of the following physical layer channel signaling methods using signaling.
Physical downlink control channel (PDCCH)
Downlink control information (DCI)
UE-specific DCI
Group common DCI
Common DCI
Scheduling DCI (e.g., DCI used for scheduling downlink or uplink data)
Non-scheduling DCI (e.g., DCI not for the purpose of scheduling downlink or uplink data)
Physical uplink control channel (PUCCH)
Uplink control information (UCI)

FIG. 1A is a view illustrating a basic structure of a time-frequency domain, which is a radio resource region in which data or control channels are transmitted in a 5G system according to an embodiment of the disclosure.

Referring to FIG. 1A, the horizontal axis refers to the time domain, and the vertical axis refers to the frequency domain.

A basic unit of a resource in the time and frequency domain is a resource element (RE) 101, which may be defined by one orthogonal frequency division multiplexing (OFDM) symbol 102 on the time axis, and by one subcarrier 103 on the frequency axis. In the frequency domain $N_{SC}^{RB}$ (e.g., 12) consecutive REs may constitute one resource block (RB) 104. Referring again to FIG. 1A, $N_{symb}^{subframe,\mu}$ is the number of OFDM symbols per subframe 100 for subcarrier spacing setting ($\mu$). For a more detailed description of the resource structure used in the 5G system, refer to TS 38.211 section 4 standard.

Figure 1B:
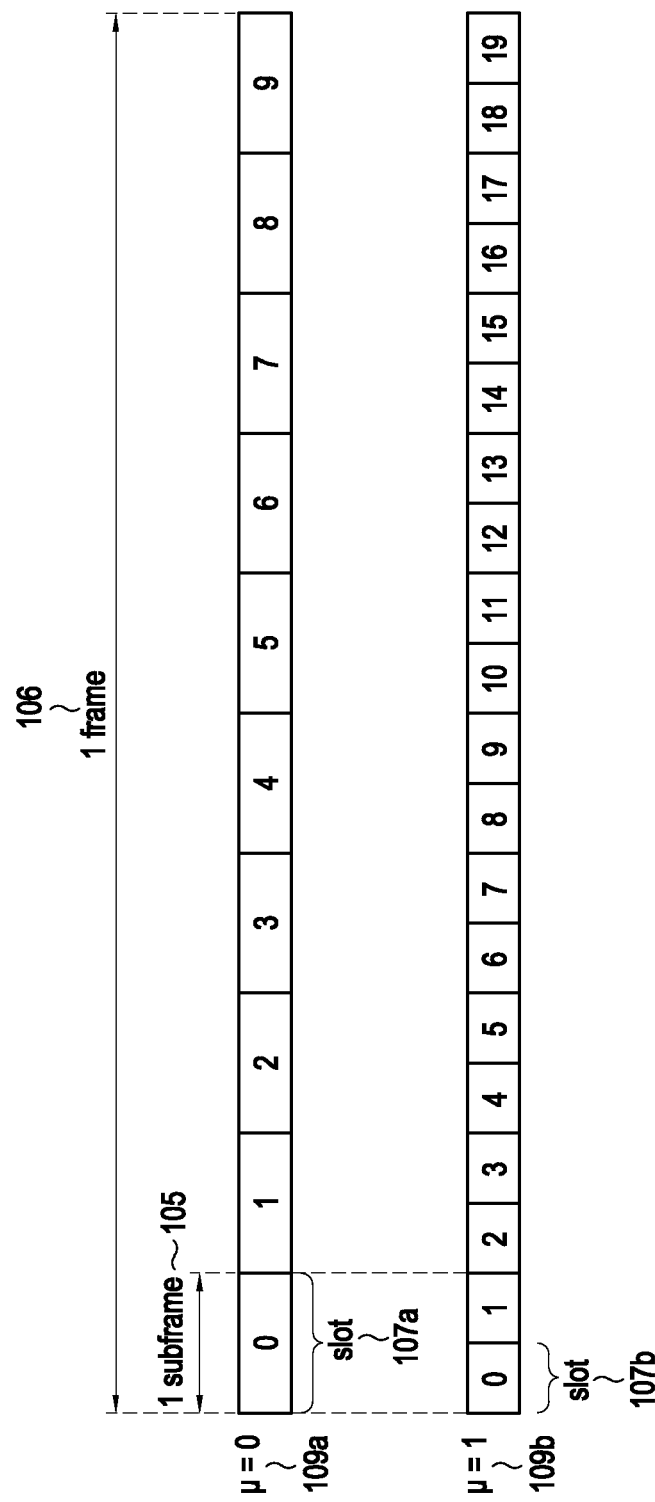
FIG. 1B is a view illustrating a frame, a subframe, and a slot structure of a 5G system according to an embodiment of the disclosure.

FIG. 1B is a view illustrating a frame, a subframe, and a slot structure of a 5G system according to an embodiment of the disclosure.

Referring to FIG. 1B, a structure of a frame 106, a subframe 105, and a slot 107a or 107b is illustrated. One frame 106 may be defined as 10 ms. One subframe 105 may be defined as 1 ms, and thus, one frame 106 may consist of a total of 10 subframes 105. One slot 107a or 107b may be defined as 14 OFDM symbols (i.e., the number ($N_{symb}^{slot}$) of symbols per slot=14). One subframe 105 may be composed of one or more slots 107a and 107b, and the number of slots 107a and 107b per subframe 105 may differ depending on $\mu$ (109a or 109b), which is a set value for the subcarrier spacing. Referring again to FIG. 1B, an example in which the subcarrier spacing setting value $\mu$=0 (109a) and an example in which the subcarrier spacing setting value $\mu$=1 (109b) is illustrated. When $\mu$=0 (109a), one subframe 105 may consist of one slot 107a, and when $\mu$=1 (109b), one subframe 105 may consist of two slots 107b. In other words, according to the set subcarrier spacing value u, the number ($N_{slot}^{subframe,\mu}$) of slots per subframe may vary, and accordingly, the number ($N_{slot}^{frame,\mu}$) of slots per frame may differ. According to each subcarrier spacing $\mu$, $N_{slot}^{subframe,\mu}$ and $N_{slot}^{frame,\mu}$ may be defined in Table 1 below.

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the disclosure, full duplex (FD) system means a system capable of simultaneously transmitting/receiving uplink and downlink signals in the same time resource unlike the time division duplex (TDD) or frequency division duplex (FDD) systems. The TDD, FDD, and FD schemes may be referred to as a duplex scheme. The TDD scheme is a multiplexing scheme that allocates resources at different times for uplink and downlink in the same frequency band. The FDD scheme is a multiplexing scheme that allocates resources in different frequency bands for uplink and downlink at the same time and is incapable of simultaneous transmission/reception of uplink and downlink signals in the same frequency band. In the FD scheme, an uplink (UL) signal and downlink (DL) signal may be simultaneously transmitted/received at the same time. In the FD scheme, the base station may transmit a DL signal to a UE while simultaneously receiving a UL signal from another UE. In the following embodiments of the disclosure, it is assumed that the base station supports the FD scheme capable of simultaneous transmission and reception, and the UE supports the half-duplex scheme that may perform transmission or reception individually but not simultaneously. The embodiments of the disclosure may also apply to UEs supporting the FD scheme. The embodiments of the disclosure may be applied to post-5G next-generation systems (e.g., 6G systems) as well as 5G systems.

The disclosure proposes a method and device for preventing analog-to-digital converter (ADC) saturation in a UE receiving a downlink (DL) signal in a wireless communication system in which cross-link interference (CLI) exists. The CLI is interference that occurs between a UE receiving a DL signal and UEs transmitting UL signals. For example, the UL signal transmitted from a UE interferes with another UE positioned adjacent to the UE to receive the DL signal. The CLI may cause ADC saturation to the UE receiving the DL signal.

Figure 1C:
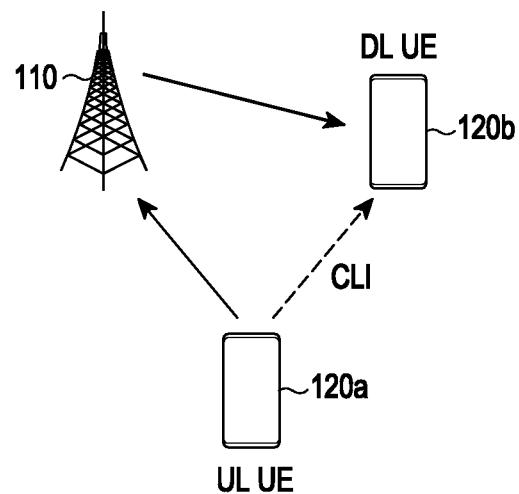
FIG. 1C is a view illustrating ADC saturation due to CLI in an ADC in a UE receiving a DL signal from a beacon signal in a wireless communication system in which CLI exists according to an embodiment of the disclosure.

FIG. 1C is a view illustrating ADC saturation due to CLI in an ADC in a UE receiving a DL signal from a beacon signal in a wireless communication system in which CLI exists according to an embodiment of the disclosure.

Referring to FIG. 1C, in a wireless communication system in which CLI exists, an ADC (not shown) in a first UE 120b receiving a DL signal from a base station 110 is controlled for its input range not to prevent the ADC from being saturated according to the power level of the DL signal. The input range control for the ADC is performed through the automatic gain control (not shown) in the first UE 120b. As well known, the AGC is a control circuit that increases or decreases the gain (power level) of the reception signal to allow the reception signal to be input within the input range of the ADC.

When the power level of the signal input to the ADC is changed according to the change in the power level of the DL signal, the AGC in the UE receiving the DL signal may control the ADC to allow the signal to be input within a linear input range of the ADC. For example, when the power level of the reception signal input to the ADC is high, the AGC controls the ADC to decrease the gain and, when the power level of the signal input to the ADC is low, the AGC may control the ADC to increase the gain. Such AGC control operation enables the ADC to operate stably without being saturated. However, when there is a second UE 120a that transmits the UL signal in a position close to the first UE 120b or, although positioned in a far distance, transmits the UL signal with relatively large signal power as in the example of FIG. 1C, the UL signal of the second UE 120a may cause CLI upon receiving the DL signal of the first UE 120b. The CLI may cause ADC saturation off the ADC input range in the first UE 120b receiving the DL signal. Further, since the first UE 120b is unaware of the power level of the UL signal causing the CLI, stable operation control on the ADC through the AGC may not be expected.

Figure 1D:
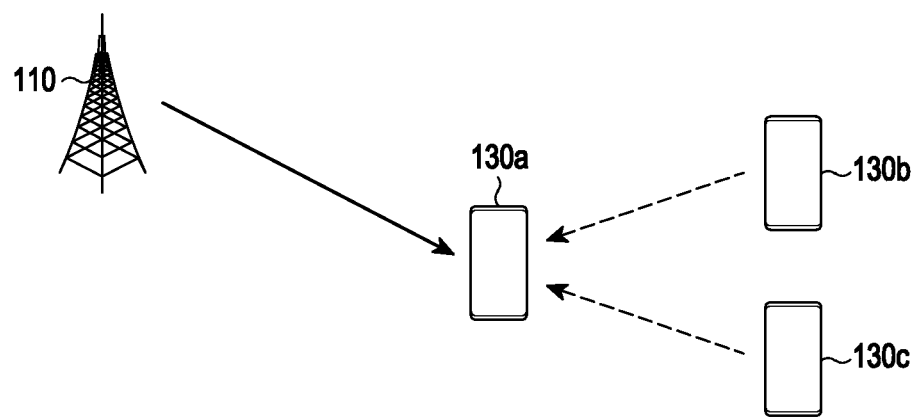
FIG. 1D is a view illustrating ADC saturation occurring upon CLI measurement in a wireless communication system in which CLI exists according to an embodiment of the disclosure.

FIG. 1D is a view illustrating ADC saturation occurring upon CLI measurement in a wireless communication system in which CLI exists according to an embodiment of the disclosure.

Referring to 3GPP standard TS 38.331 V16.5.0, CLI measurement is initiated. Referring to FIG. 1D, the UE 130a may be affected by the CLI from the UL signal(s) from at least one other adjacent UEs 130b and 130c while receiving the DL signal from the base station 110. The base station 110 may receive the CLI measurement result report from the UE 130a and reduce the CLI influence by adjusting UL scheduling for at least one of the other UEs 130b and 130c based on the CLI measurement result report. For CLI measurement, the other UEs 130b and 130c may transmit, for example, a cross-link interference-reference signal (CLI-RS), as a reference signal for CLI measurement. However, in FIG. 1D, since the UE 130a performing CLI measurement is unaware of the reception power of the signals received from the other UEs 130b and 130c, ADC saturation or quantization noise may arise in the UE 130a. For example, assuming −30 dBm with respect to the customer premises equipment (CPE) as the maximum receivable power level, if at least one of the other UEs 130b and 130c in a range of the inter-UE distance of about 5 to 70 m transmits the CLI-RS at a larger power level than −30 dBm, or the sum of the power levels of the CLI-RSs transmitted from the other UEs 130b and 130c or each power level is larger than the power level of the DL signal received from the base station 110 by the UE 130a, or if the AGC in the UE 130a is controlled according to the power level of the DL signal of the base station 110, ADC saturation may be caused by the CLI from the UL signal transmission from another UE positioned relatively in a far distance outside the range of about 5 to 70 m. Further, when the plurality of UEs 130b and 130c transmit the CLI-RSs in a frequency division multiplexing (FDM) scheme, ADC saturation may worsen. Therefore, there is required a method for preventing ADC saturation that may occur in the ADS in the UE receiving a DL signal in the wireless communication system. Further, when the AGC is applied to have an excessively low reception gain to prevent ADC saturation in the reception UE, the signal having a magnitude lower than the quantization noise of the ADC may be received by the ADC. In this case, since CLI signal measurement may be impossible due to the quantization noise, a process for setting the AGC to a proper value is required.

Figure 2A:
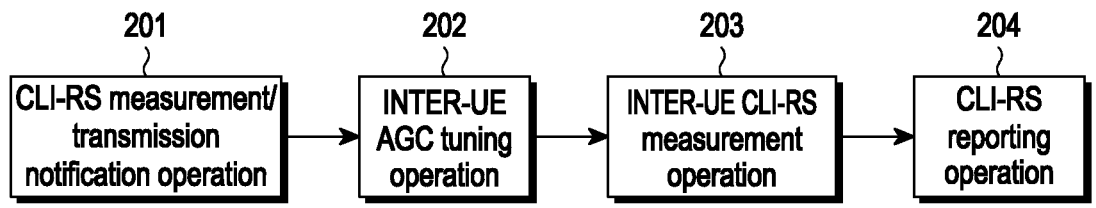
FIG. 2A is a view illustrating an example of a method for communication in a wireless communication system in which CLI exists according to an embodiment of the disclosure.

FIG. 2A is a view illustrating an example of a method for communication in a wireless communication system in which CLI exists according to an embodiment of the disclosure.

Referring to FIG. 2A, it is assumed that a first UE is a UE receiving a DL signal from the base station, and at least one second UE (hereinafter, simply referred to as a "second UE") is a UE that may cause CLI with the first UE by transmitting a UL signal.

In operation 201, the base station may receive a first signal for AGC tuning to perform AGC tuning and may also receive a second signal for CLI measurement and transmit first information for notifying/indicating to perform CLI measurement. Further, the base station may transmit second information for notifying/indicating to transmit the first signal used for AGC tuning in the first UE and the second signal used for CLI measurement to the second UE. As the first signal, for example, a CLI-RS, a signal for AGC tuning, or a normal UL signal is used. As the second signal, for example, a CLI-RS or a normal UL signal is used.

In operation 202, the second UE may transmit the first signal for AGC tuning, and the first UE may receive the first signal to perform AGC tuning. In operation 202, the first UE receiving the first signal may perform AGC tuning on the AGC to control to prevent the ADC from saturating in the first UE, that is, to adjust the magnitude of the reception signal within a linear input range of the ADC, based on the reception power level of the first signal. As described in connection with FIG. 1C, conventionally, the UE receiving the DL signal cannot know the power level of the UL signal of another UE causing CLI so that it is impossible to control the input signal level of the ADC at an appropriate value through, for example, AGC. In the disclosure, the first UE is able to measure the power level of the first signal received in an indicated/allocated symbol position through the base station, so that the first UE may perform AGC tuning based on the reception power level of the first signal.

Further, in operation 203, the second UE may transmit the second signal for CLI measurement, and the first UE may receive the second signal and perform CLI measurement. The first signal and the second signal may be transmitted at the same transmission power in different symbol positions. As an alternative embodiment, the first signal and the second signal may be transmitted at different transmission powers. As the first signal and the second signal, signals having the same sequence or different signals may also be used. Thereafter, in operation 204, the first UE having performed CLI measurement may transmit a report message including the CLI measurement result (i.e., CLI measurement information) to the base station.

In the disclosure, as described above, the first signal for AGC tuning may be a CLI-RS, any signal for AGC tuning, or a normal UL signal, and the second signal for CLI measurement may be a CLI-RS or a normal UL signal. The base station may provide the first UE and the second UE with resource allocation information in the frequency domain and/or time domain for the resource(s) where the first signal and the second signal respectively are transmitted. For example, the base station previously provides information about a resource set or resource pool where at least one of the first signal or second signal may be transmitted through the above-described higher layer signaling (e.g., SIB or RRC information) and may allocate/indicate at least one resource where at least one of the first signal or second signal is transmitted of the resource set, to the UE through L1 signaling (e.g., DCI). In this case, the first information and the second information may be transmitted to the first UE and second UE, respectively, using L1 signaling. As an alternative embodiment, the first information and second information may include information (e.g., resource allocation information about the slot and/or symbol where the first signal is transmitted) about the resource(s) where the first signal and second signal are transmitted. Further, as an alternative embodiment, the base station may provide information about the resource where the first signal is transmitted to the first UE and second UE through the first information and second information, respectively, allowing the first UE and second UE to implicitly identify/determine the position of at least one resource where the second signal is transmitted based on the provided resource information. For example, when the second signal is transmitted in a position which is away from the symbol where the first signal is transmitted by pre-agreed symbols, the first UE and second UE identifies/determines the resource position where the second signal is transmitted from the resource position where the first signal is transmitted.

In the disclosure, the second UE receiving the second information may form a beam in the same direction as that when a normal UL signal is transmitted, transmitting the first signal and second signal each. As an alternative embodiment, the second UE may transmit the first signal and second signal in the respective directions through sweeping. As an alternative embodiment, the base station may identify the position information about the first UE and indicate, to the second UE, to transmit the first signal and second signal in the direction corresponding to the position information. In this case, the first information may include information indicating the direction of the beam for transmitting the first signal.

The signaling scheme for the first information and second information may be commonly applied to the embodiments of the disclosure.

In operation 204, the base station may adjust UL scheduling for at least one second UE to prevent the first UE from facing ADC saturation due to CLI influence, based on the CLI measurement result received from the first UE. For example, when CLI influence on the first UE increases, UL scheduling is not done on at least one second UE, so that the first UE is avoided from facing ADC saturation.

Figure 2B:
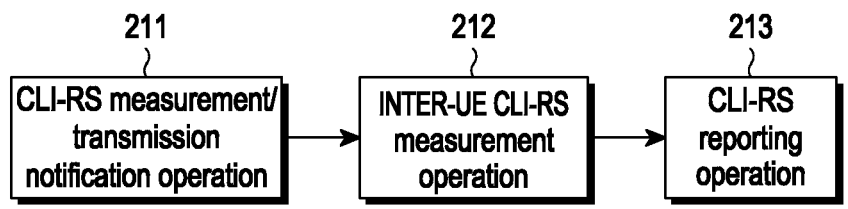
FIG. 2B is a view illustrating another example of a method for communication in a wireless communication system in which CLI exists according to an embodiment of the disclosure.

FIG. 2B is a view illustrating another example of a method for communication in a wireless communication system in which CLI exists according to an embodiment of the disclosure. The example of FIG. 2B is an embodiment in which AGC tuning is omitted from the example of FIG. 2A, and the other operations may be performed in the same manner as in the embodiment of FIG. 2A, and no detailed description thereof is given below.

Referring to FIG. 2B, in operation 211 of FIG. 2B, the base station may transmit, to the first UE, the first information for receiving at least one signal (e.g., CLI-RS or normal UL signal) used for CLI measurement and indicating to perform CLI measurement. Further, the base station may transmit, to the second UE, second information for indicating to transmit the at least one signal, used for CLI measurement. In operation 212, the second UE may transmit the at least one signal for CLI measurement, and the first UE may receive the at least one signal and perform CLI measurement. The at least one signal may be transmitted at the same transmission power in different symbol positions. Thereafter, in operation 213, the first UE having performed CLI measurement may transmit a report message including the CLI measurement result (i.e., CLI measurement information) to the base station. Then, the base station may adjust UL scheduling for at least one second UE to prevent the first UE from facing ADC saturation due to CLI influence, based on the CLI measurement result received from the first UE.

Figure 3:
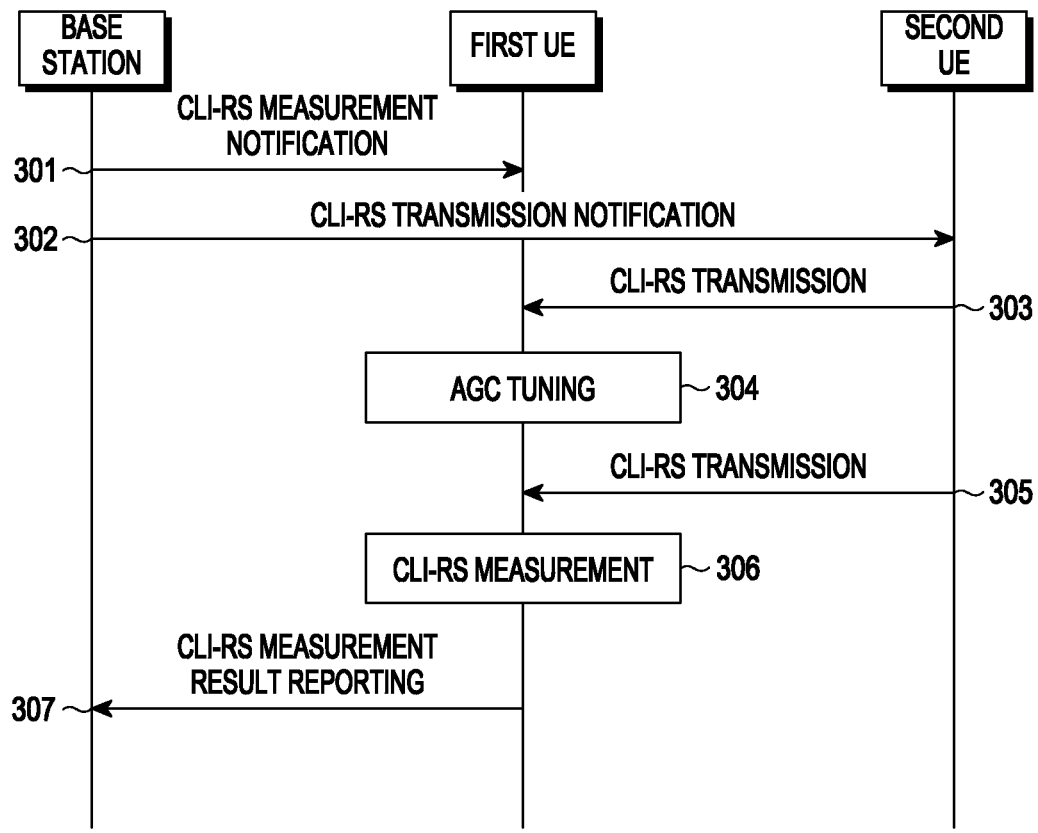
FIG. 3 is a view illustrating an example of a method for AGC tuning and CLI measurement in a wireless communication system in which CLI exists according to an embodiment of the disclosure.

FIG. 3 is a view illustrating an example of a method for AGC tuning and CLI measurement in a wireless communication system in which CLI exists according to an embodiment of the disclosure. FIG. 3 illustrates an example in which a CLI-RS is used as each of the first signal and second signal in the example of FIG. 2A.

Referring to FIG. 3, in operation 301, the base station may transmit, to the first UE, a CLI-RS measurement notification message (i.e., the first information in FIG. 2A) for indicating to receive the first signal (i.e., first CLI-RS) for AGC tuning to perform AGC tuning and receive the second signal (i.e., second CLI-RS) for CLI measurement to perform CLI measurement. Further, in operation 302, the base station may transmit, to the second UE, a CLI-RS transmission notification message (i.e., the second information in FIG. 2A) for indicating to transmit each of the first signal (i.e., first CLI-RS) used for AGC tuning and the second signal (i.e., second CLI-RS) used for CLI measurement.

Thereafter, in operation 303, the second UE may transmit the first CLI-RS for AGC tuning and, in operation 304, the first UE may receive the first CLI-RS and perform AGC tuning. Further, in operation 305, the second UE may transmit the second CLI-RS for CLI measurement and, in operation 306, the first UE may receive the second CLI-RS and perform CLI measurement. Thereafter, in operation 307, the first UE having performed CLI measurement may transmit a report message including the CLI measurement result (i.e., CLI measurement information) to the base station.

In the example of FIG. 3, the second UE (i.e., CLI-RS transmission UE) may perform first signal transmission for AGC tuning upon CLI-RS transmission and then transmit the second signal for CLI-RS measurement. In this case, the second UE (i.e., CLI-RS transmission UE) may transmit the CLI-RSs transmitted through the first signal and second signal, at the same transmission power.

Further, as an alternative embodiment, when a normal UL signal (e.g., a signal, such as physical uplink shared channel (PUSCH), physical uplink control channel (PUCCH), or sounding reference signal (SRS)) is not scheduled on the second UE within a symbol period from the first symbol where the first CLI-RS is transmitted until immediately before the second symbol, the second UE may transmit a plurality of CLI-RSs (at the same transmission power) in the symbol period.

Further, in operation 307, the first UE may perform CLI measurement result (i.e., CLI measurement information) using method 1-1), 1-2), or 1-3) below. The CLI measurement result reporting using method 1-1), 1-2), or 1-3) below may be commonly applied to the embodiments of the disclosure.

1-1) Transmitting the CLI measurement result including the RSRP or RSSI measured for the second CLI-RS, by the CLI-RS reporting resource 1-2) Reporting a measurement result, which reflects the result of measurement for the second CLI-RS together with the result of measurement using a different RS, such as channel state information-reference signal (CSI-RS), by the CLI-RS reporting resource. For example, a channel quality indicator (CQI), precoding matrix indicator (PMI), or rank indicator (RI), which reflects the result of measurement on the second CLI-RS along with the existing RS measurement result, such as non-zero power (NZP)-CSI-RS or CSI-interference measurement (IM), is generated and reporting is performed. As an example, a new CQI' may be generated based on the CSI-RS and CLI-RS in such a manner as to add the noise component due to the CLI-RS to the noise component in the signal-to-noise ratio by using the existing CSI-RS 1-3) Reporting the measurement result, which reflects the result of measurement on the second CLI-RS along with the result of measurement using a different RS, such as CSI-RS, by the CQI reporting resource. The reflected specific result is generated in the same manner as in 1-2)

Further, in the disclosure, the CLI-RS measurement result may use at least one of methods 2-1) to 2-6) according to the feedback overhead.

2-1) Reporting all the measurement results. What CLI-RS each measurement result is about may be marked and reported (CLI-RS index reporting)

Figure 4A:
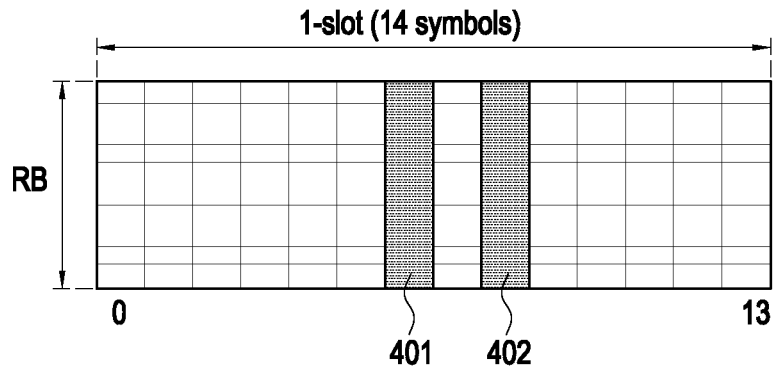
FIGS. 4A, 4B, and 4C are views illustrating a resource allocation method for AGC tuning and/or CLI measurement in a wireless communication system in which CLI exists according to an embodiment of the disclosure.
Figure 4B:
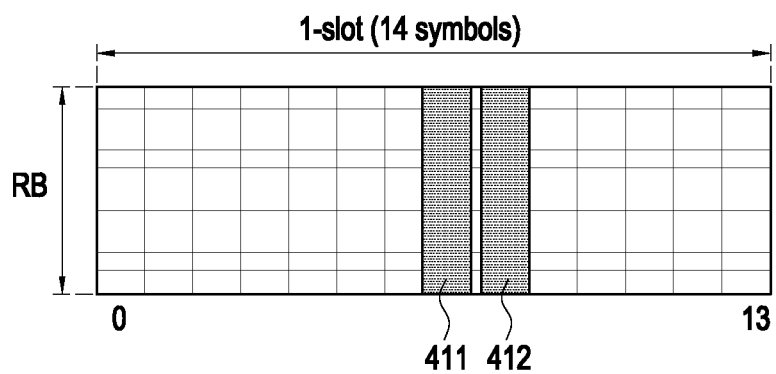
Figure 4C:
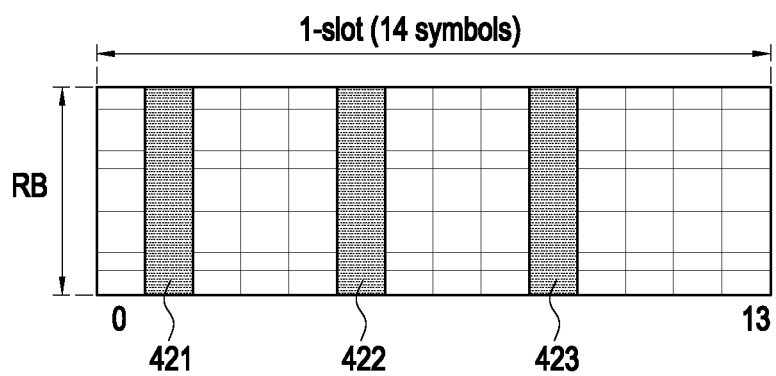

2-2) Reporting smallest CLI+CLI-RS index 2-3) Reporting N smallest CLIs+CLI-RS index 2-4) Reporting the average measurement result 2-5) Reporting N measurement results selected based on a threshold 2-6) Black-list: Reporting, with the second UE included in a black list causing CLI. In this case, the base station may restrict UL scheduling on the second UE upon DL scheduling on the first UE considering the CLI influence on the second UE included in the black list FIGS. 4A, 4B, and 4C are views illustrating a resource allocation method for AGC tuning and/or CLI measurement in a wireless communication system in which CLI exists according to various embodiments of the disclosure. According to the method described in connection with FIGS. 4A to 4C, the second UE may transmit a CLI-RS in an allocated/designated symbol position, and the first UE may receive the CLI-RS in an allocated/designated symbol position. The resource allocation method according to the example of FIGS. 4A to 4C may be commonly applied to the embodiments of the disclosure.

FIGS. 4A to 4C illustrate an example in which in a first slot period including 14 symbols (symbol indexes "0" to "13"), at least one symbol 401, 411, and 421 is allocated for transmission of a first signal (e.g., a CLI-RS, a signal for AGC tuning, or a normal UL signal), and at least one symbol 402, 412, and 423 is allocated for transmission of a second signal (e.g., a CLI-RS or a normal UL signal).

Referring to FIG. 4A, an example in which the second signal is transmitted in the symbol 402, one symbol after the first signal is transmitted in the symbol 401 is illustrated, and referring to FIG. 4B, an example in which the second signal is continuously transmitted in the symbol 412 which is immediately subsequent to the symbol 411 after the first signal is transmitted in the symbol 411 is illustrated. When the first signal and the second signal are transmitted in the contiguous symbols as shown in FIG. 4B, the first UE may continuously perform AGC tuning and CLI measurement. In this case, the communication environments in which AGC tuning and CLI measurement are performed are substantially the same, so that effective/stable operation may be performed.

Referring to FIG. 4C, an example in which CLI-RSs are transmitted at an interval of a predetermined number of symbols is illustrated. For example, after the first signal is transmitted in the symbol 421, the second signal is transmitted in the symbols 422 and 423 or, after the first signal is transmitted in the symbols 421 and 422, the second signal may be transmitted in the symbol 423.

In the disclosure, resources for AGC tuning and/or CLI measurement may be designated by method 3-1), 3-2), or 3-3) below.

3-1) Designating a plurality of temporally contiguous symbols or temporally non-contiguous symbol positions upon CLI-RS designation 3-2) Designating one symbol and then one or more symbols with at least one symbol interval left therefrom upon CLI-RS designation 3-3) Designating one symbol upon CLI-RS designation Further, as an alternative embodiment, the first UE, which is a CLI measurement UE, and the second UE, which is a CLI-RS transmission UE, may interpret a symbol position other than one designated symbol, as the CLI-RS position according to a pre-agreed scheme. For example, when the base station designates the CLI-RS allocation position as the kth symbol of the nth slot, the UE interprets the k+1th position as the CLI-RS allocation position as well.

Figure 5:
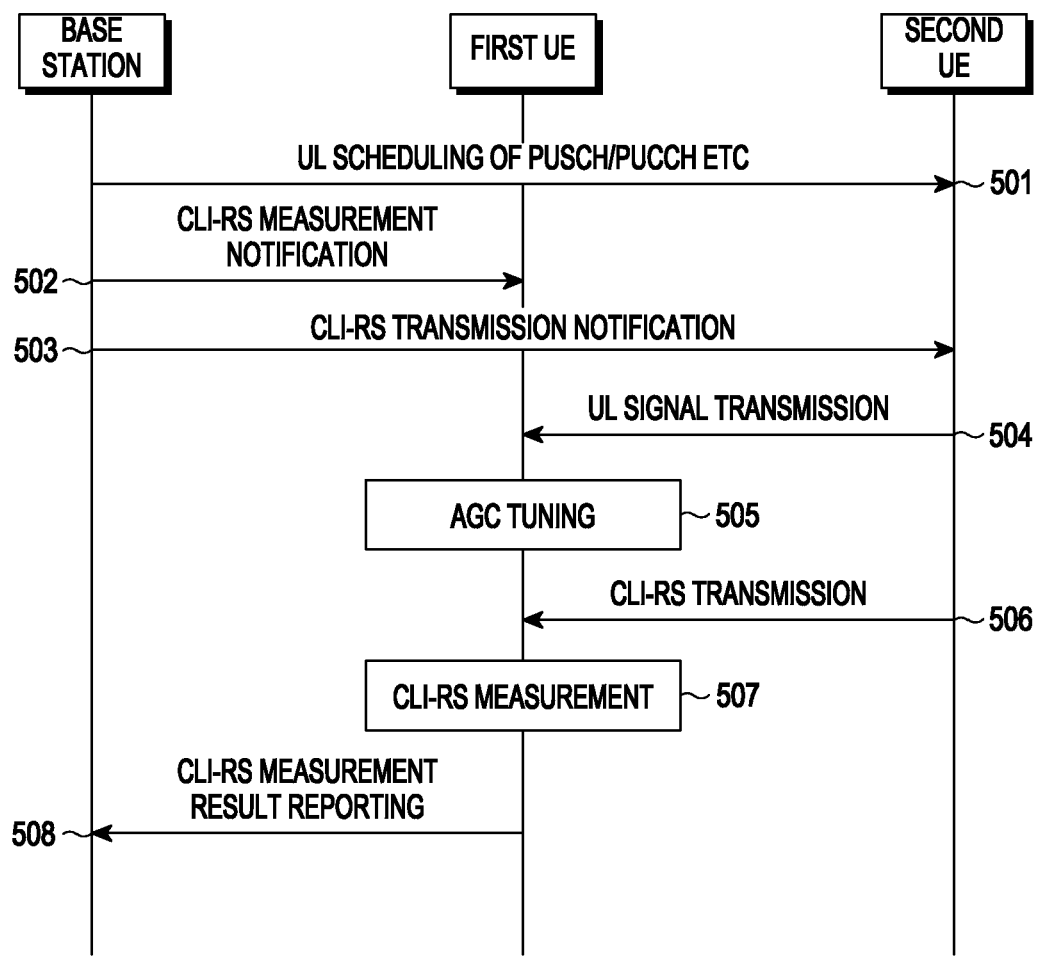
FIG. 5 is a view illustrating an example of a method for AGC tuning and CLI measurement in a wireless communication system in which CLI exists according to an embodiment of the disclosure.

FIG. 5 is a view illustrating an example of a method for AGC tuning and CLI measurement in a wireless communication system in which CLI exists according to an embodiment of the disclosure. FIG. 5 illustrates an example in which when the base station schedules a normal UL signal first for the second UE, a normal UL signal and a CLI-RS are used as the first signal and the second signal, respectively, in the example of FIG. 2A.

Referring to FIG. 5, in operation 501, the base station may schedule a normal UL signal (e.g., PUSCH, PUCCH, or SRS) for the second UE. Thereafter, in operation 502, the base station may transmit, to the first UE, a CLI-RS measurement notification message (first information) to indicate to receive the first signal (normal UL signal) for AGC tuning to perform AGC tuning and receive the second signal (CLI-RS) for CLI measurement to perform CLI measurement. Further, in operation 503, the base station may transmit, to the second UE, a CLI-RS transmission notification message (second information) for indicating to transmit each of the first signal (normal UL signal) used for AGC tuning and the second signal (CLI-RS) used for CLI measurement.

In operation 504, the second UE may identify whether the normal UL signal is scheduled for the second UE in the symbol period from the first symbol where transmission of the first signal (normal UL signal) is indicated until immediately before the second symbol where transmission of the second signal (CLI-RS) is indicated and, when a normal UL signal is scheduled for the second UE in the symbol period, transmit the scheduled normal UL signal without performing CLI-RS transmission in the symbol period including the first symbol.

In operation 505, the first UE may receive the normal UL signal to perform AGC tuning. Further, in operation 506, the second UE may transmit the second CLI-RS for CLI measurement and, in operation 507, the first UE may receive the second signal (CLI-RS) to perform CLI measurement. Thereafter, in operation 508, the first UE having performed CLI measurement may transmit a report message including the CLI measurement result (i.e., CLI measurement information) to the base station. Meanwhile, in the embodiment of FIG. 5, the second UE may perform second signal (CLI-RS) transmission at the same transmission power as the normal UL signal. Performing second signal (CLI-RS) transmission at the same transmission power as the normal UL signal may help to stably perform CLI measurement subsequent to AGC tuning.

Figure 6:
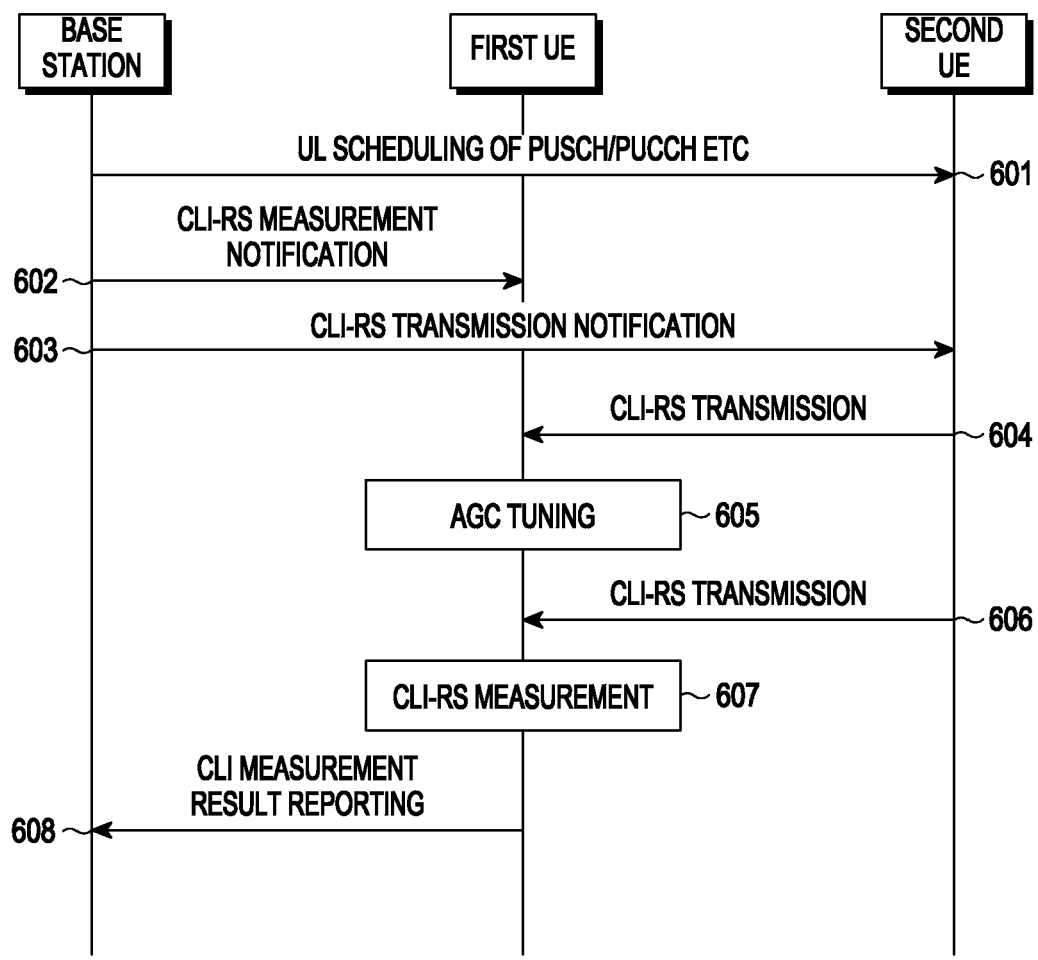
FIG. 6 is a view illustrating an example of a method for AGC tuning and CLI measurement in a wireless communication system in which CLI exists according to an embodiment of the disclosure.

FIG. 6 is a view illustrating an example of a method for AGC tuning and CLI measurement in a wireless communication system in which CLI exists according to an embodiment of the disclosure. FIG. 6 illustrates an example in which when the base station schedules a normal UL signal first for the second UE, a CLI-RS is used as each of the first signal and the second signal in the example of FIG. 2A.

Referring to FIG. 6, in operation 601, the base station may schedule a normal UL signal (e.g., PUSCH, PUCCH, or SRS) for the second UE. Thereafter, in operation 602, the base station may transmit, to the first UE, a CLI-RS measurement notification message (first information) to indicate to receive the first signal (first CLI-RS) for AGC tuning to perform AGC tuning and receive the second signal (second CLI-RS) for CLI measurement to perform CLI measurement. Further, in operation 603, the base station may transmit, to the second UE, a CLI-RS transmission notification message (second information) for indicating to transmit each of the first signal (first CLI-RS) used for AGC tuning and the second signal (CLI-RS) used for CLI measurement.

In operation 604, the second UE may identify whether the normal UL signal is scheduled for the second UE in the symbol period from the first symbol where transmission of the first CLI-RS is indicated until immediately before the second symbol where transmission of the second CLI-RS is indicated and, when a normal UL signal is scheduled for the second UE in the symbol period, transmit the first CLI-RS without transmitting the normal UL signal scheduled in the first symbol. Normal UL transmission may be performed in the remaining scheduled symbol(s) except for the first symbol in the symbol period.

In operation 605, the first UE may receive the first CLI-RS to perform AGC tuning. Further, in operation 606, the second UE may transmit the second CLI-RS for CLI measurement and, in operation 607, the first UE may receive the second CLI-RS and perform CLI measurement. Thereafter, in operation 608, the first UE having performed CLI measurement may transmit a report message including the CLI measurement result (i.e., CLI measurement information) to the base station. Meanwhile, in the embodiment of FIG. 6, the second UE may perform second CLI-RS transmission at the same transmission power as the first CLI-RS transmission. Performing second CLI-RS transmission at the same transmission power as the first CLI-RS transmission may help to stably perform CLI measurement subsequent to AGC tuning.

Meanwhile, as an alternative embodiment, in the embodiments of FIGS. 5 and 6 in which scheduling a normal UL signal (e.g., PUSCH) is performed earlier than CLI-RS measurement/transmission indication, if the second UE is able to perform rate matching on the PUSCH signal, the second UE may perform rate matching on the area where the CLI-RS is transmitted and transmit the PUSCH signal. Further, when the second UE is unable to perform rate matching on the PUSCH signal, the second UE may perform puncturing on the area where the CLI-RS is transmitted and transmit the PUSCH signal.

Figure 7A:
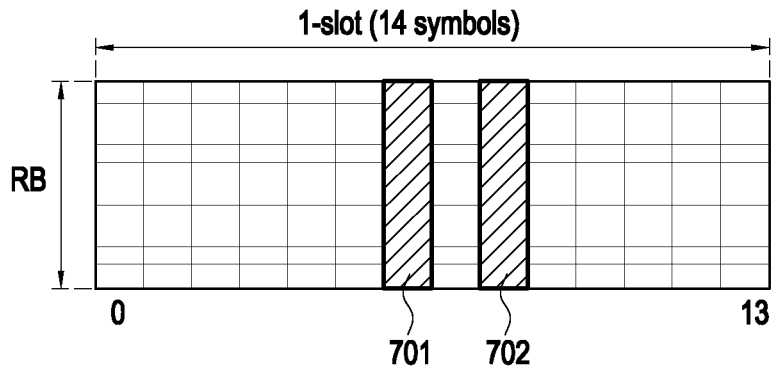
FIGS. 7A, 7B, and 7C are views illustrating an example of resource allocation for transmission of a CSI-RS and/or normal UL signal in a method for AGC tuning and CLI measurement in a wireless communication system in which CLI exists according to various embodiments of the disclosure.
Figure 7B:
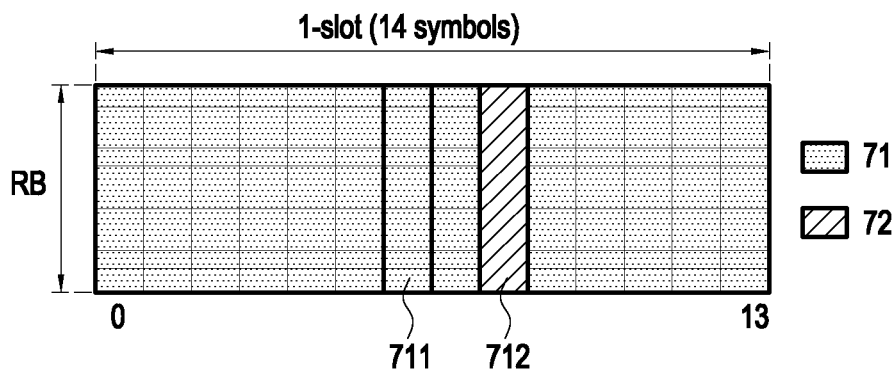
Figure 7C:
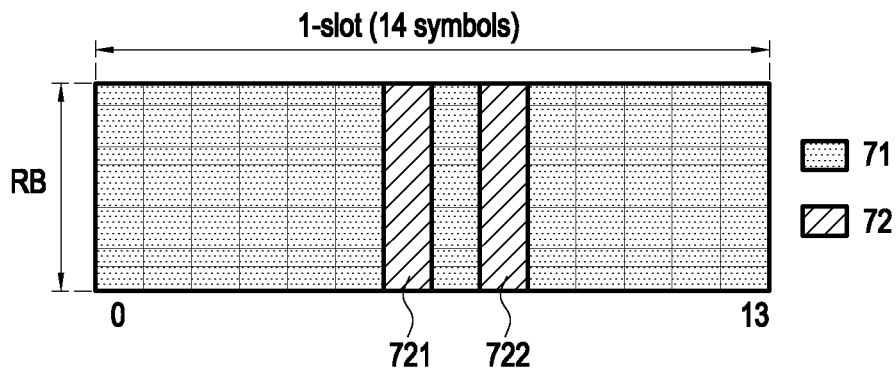

FIGS. 7A, 7B, and 7C are views illustrating an example of resource allocation for transmission of a CSI-RS and/or normal UL signal in a method for AGC tuning and CLI measurement in a wireless communication system in which CLI exists according to various embodiments of the disclosure.

Referring to FIG. 7A, an example in which a first symbol 701 for first CLI-RS transmission and a second symbol 702 for second CLI-RS transmission are allocated in a slot according to the embodiment of FIG. 3 is illustrated. Referring to FIG. 7B, an example in which when a normal UL signal (e.g., PUSCH, PUCCH, or SRS) is first scheduled in a slot, a first symbol 711 for normal UL signal transmission and a second symbol 712 for second CLI-RS transmission are allocated, instead of the first CLI-RS, according to the embodiment of FIG. 5 is illustrated. Referring to FIG. 7C, an example in which when a normal UL signal (e.g., PUSCH, PUCCH, or SRS) is first scheduled in a slot, a first symbol 721 for first CLI-RS transmission and a second symbol 722 for second CLI-RS transmission are allocated, instead of the normal UL signal, according to the embodiment of FIG. 6 is illustrated. Referring to FIGS. 7B and 7C, reference number 71 denotes the symbol area where the normal UL (or DL signal) is transmitted, and reference number 72 denotes the symbol area where the CLI-RS is transmitted.

Figure 8:
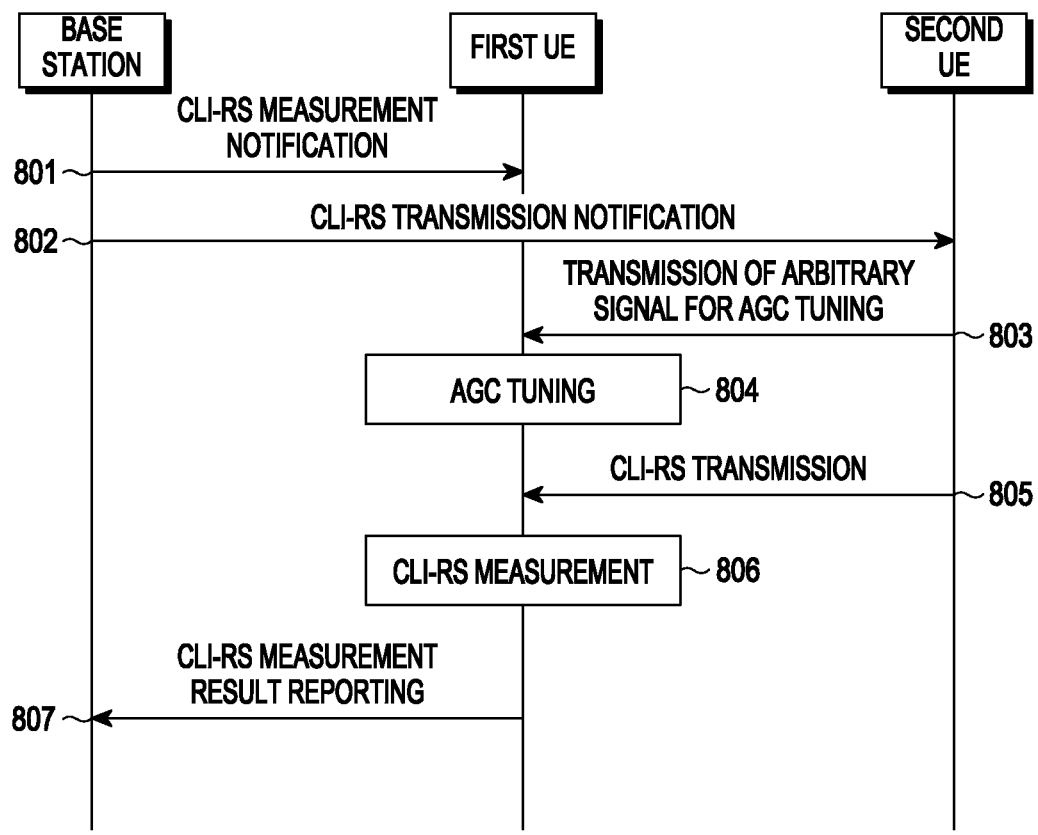
FIG. 8 is a view illustrating an example of a method for AGC tuning and CLI measurement in a wireless communication system in which CLI exists according to an embodiment of the disclosure.

FIG. 8 is a view illustrating an example of a method for AGC tuning and CLI measurement in a wireless communication system in which CLI exists according to an embodiment of the disclosure. FIG. 8 illustrates an example in which an arbitrary signal for AGC tuning and a CLI-RS are used as the first signal and second signal, respectively, in the example of FIG. 2A. The example of FIG. 8 may be performed when a normal UL signal is not previously scheduled for the second UE as the arbitrary signal for AGC tuning and the CLI-RS are used.

Referring to FIG. 8, in operation 801, the base station may transmit, to the first UE, a CLI-RS measurement notification message (first information) to indicate to receive the first signal (arbitrary signal for AGC tuning) for AGC tuning to perform AGC tuning and receive the second signal (CLI-RS) for CLI measurement to perform CLI measurement. Further, in operation 802, the base station may transmit, to the second UE, a CLI-RS transmission notification message (second information) to indicate to transmit each of the first signal (arbitrary signal for AGC tuning) used for AGC tuning in the first UE and the second signal (CLI-RS) used for CLI measurement.

Thereafter, in operation 803, the second UE may transmit the arbitrary signal for AGC tuning for AGC tuning and, in operation 804, the first UE may receive the arbitrary signal for AGC tuning to perform AGC tuning. Further, in operation 805, the second UE may transmit the CLI-RS for CLI measurement and, in operation 806, the first UE may receive the CLI-RS to perform CLI measurement. Thereafter, in operation 807, the first UE having performed CLI measurement may transmit a report message including the CLI measurement result (i.e., CLI measurement information) to the base station. In the example of FIG. 8, the second UE may transmit the arbitrary signal for AGC tuning and the CLI-RS at the same transmission power.

Figure 9:
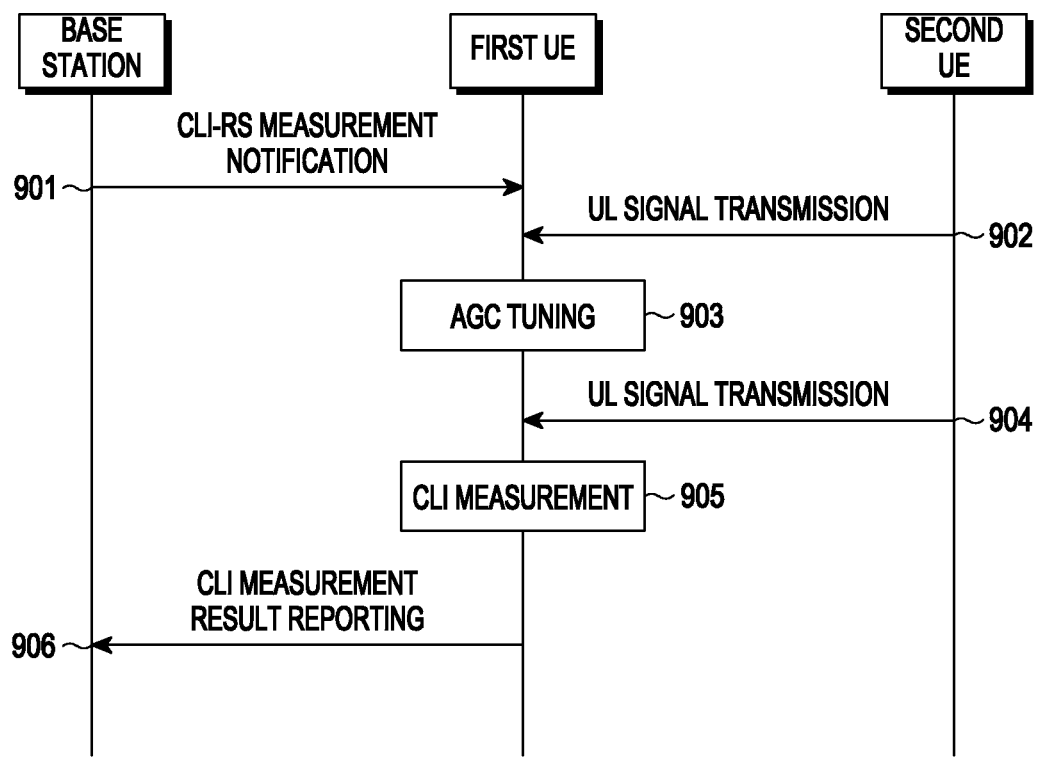
FIG. 9 is a view illustrating an example of a method for AGC tuning and CLI measurement in a wireless communication system in which CLI exists according to an embodiment of the disclosure.

FIG. 9 is a view illustrating an example of a method for AGC tuning and CLI measurement in a wireless communication system in which CLI exists according to an embodiment of the disclosure. FIG. 9 illustrates an example of using a normal UL signal (e.g., PUSCH, PUCCH, or SRS) scheduled for the second UE by the base station with the first signal and the second signal. In the example of FIG. 9, as the normal UL signal transmitted by the second UE with the first signal and the second signal is used, it is possible to omit the transmission of a CLI-RS transmission notification message (i.e., second information) from the base station to the second UE.

Referring to FIG. 9, in operation 901, the base station may transmit, to the first UE, a CLI-RS measurement notification message (i.e., first information) to indicate to receive the first signal (normal UL signal) for AGC tuning to perform AGC tuning and receive the second signal (normal UL signal) for CLI measurement to perform CLI measurement. In operation 902, the second UE may transmit a normal UL signal and, in operation 903, the first UE may receive the normal UL signal of operation 902 to perform AGC tuning. Further, in operation 904, the second UE may transmit a normal UL signal and, in operation 905, the first UE may receive the normal UL signal of operation 904 to perform CLI measurement. Thereafter, in operation 906, the first UE having performed CLI measurement may transmit a report message including the CLI measurement result (i.e., CLI measurement information) to the base station.

Figure 10:
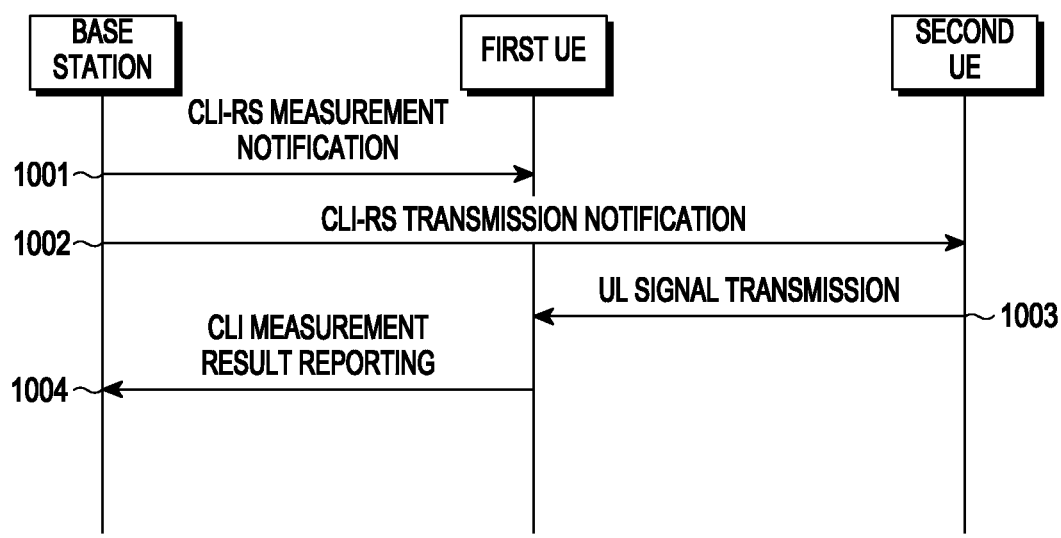
FIG. 10 is a view illustrating an example of a method for CLI measurement in a wireless communication system in which CLI exists according to an embodiment of the disclosure.

FIG. 10 is a view illustrating an example of a method for CLI measurement in a wireless communication system in which CLI exists according to an embodiment of the disclosure.

FIG. 10 illustrates an example in which the base station transmits a power parameter(s) to the second UE, and the second UE decreases the transmission power of the normal UL signal (e.g., PUSCH, PUCCH, or SRS) in a specific resource position (e.g., a specific symbol) for CLI measurement based on the power parameter(s) and transmit it, making it possible to omit the AGC tuning operation by the first UE. The power parameter(s) is set so that the above-described ADC saturation does not occur in the first UE.

Referring to FIG. 10, in operation 1001, the base station may transmit, to the first UE, a CLI-RS measurement notification message (i.e., first information) to indicate to receive the signal (normal UL signal) for CLI measurement to perform CLI measurement. Further, in operation 1002, the base station may transmit, to the second UE, a CLI-RS transmission notification message (second information) to indicate to transmit a signal (normal UL signal) used for CLI measurement. In this case, the second information may include at least one of the power parameter(s) and the specific resource position. The power parameter(s) may include, for example, power level offset to decrease transmission power. In operation 1003, the second UE may decrease the transmission power in the specific resource position by the power level offset and transmit it. Thereafter, the second UE may recover the transmission power to the original transmission power upon transmitting the normal UL signal. In operation 1004, the first UE may receive the normal UL signal transmitted at the low transmission power to perform CLI measurement and transmit, to the base station, a report message including the CLI measurement result (i.e., CLI measurement information). According to the example of FIG. 10, it is possible to reduce signaling overhead for CLI measurement. As an alternative embodiment, in the example of FIG. 10, it is also possible to reduce the transmission power of a CLI-RS instead of the normal UL signal and transmit it.

Figure 11:
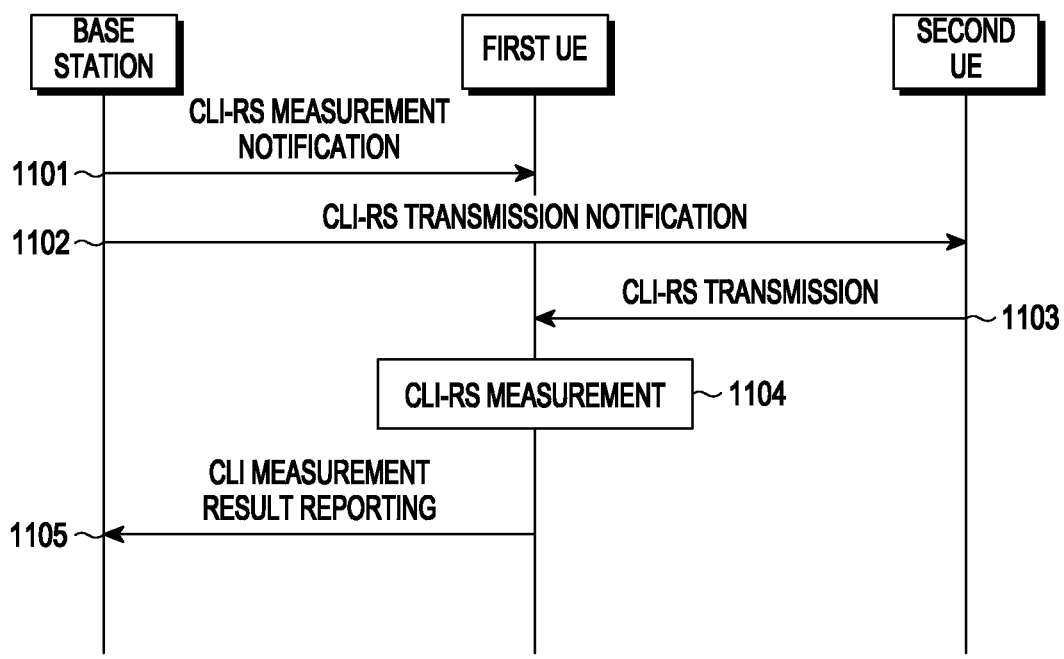
FIG. 11 is a view illustrating an example of a method for CLI measurement in a wireless communication system in which CLI exists according to an embodiment of the disclosure.

FIG. 11 is a view illustrating an example of a method for CLI measurement in a wireless communication system in which CLI exists according to an embodiment of the disclosure.

Referring to FIG. 11, an example in which it is possible to omit the AGC tuning operation by the first UE is illustrated.

In operation 1101 of FIG. 11, the base station may transmit, to the first UE, a CLI-RS measurement notification message (first information) to indicate to receive a signal (CLI-RS) for CLI measurement to perform CLI measurement. Further, in operation 1102, the base station may transmit, to the second UE, a CLI-RS transmission notification message (second information) to indicate to transmit a signal (CLI-RS) used for CLI measurement. In operation 1003, the second UE transmits a CLI-RS and, in operation 1104, the first UE receives the CLI-RS to perform CLI measurement. In this case, the first UE may identify whether ADC saturation occurs upon receiving the CLI-RS. In operation 1105, a report message including the CLI measurement result (i.e., CLI measurement information) may be transmitted to the base station. Upon identifying ADC saturation in operation 1104, the first UE may include information indicating the ADC saturation in the report message. According to the example of FIG. 10, it is possible to reduce signaling overhead for CLI measurement.

Figure 12:
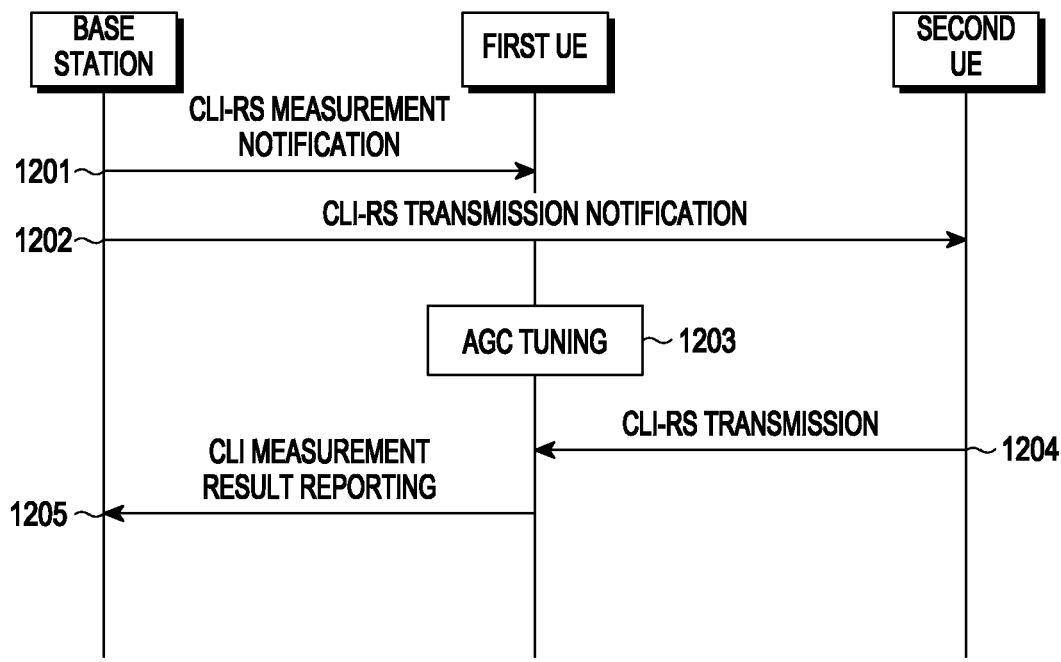
FIG. 12 is a view illustrating an example of a method for AGC tuning and CLI measurement in a wireless communication system in which CLI exists according to an embodiment of the disclosure.

FIG. 12 is a view illustrating an example of a method for AGC tuning and CLI measurement in a wireless communication system in which CLI exists according to an embodiment of the disclosure.

Referring to FIG. 12, in operation 1201 of FIG. 12, the base station may transmit, to the first UE, a CLI-RS measurement notification message (first information) to indicate to receive a signal (CLI-RS) for CLI measurement after performing AGC tuning and perform CLI measurement. Further, in operation 1202, the base station may transmit, to the second UE, a CLI-RS transmission notification message (second information) to indicate to transmit a signal (CLI-RS) used for CLI measurement. In operation 1203, the first UE performs AGC tuning. In this case, to prevent ADC saturation upon CLI measurement, AGC tuning may be performed in such a manner that the AGC adjusts the gain at the minimum reception power level. In operation 1204, the second UE transmits a CLI-RS and, in operation 1205, the first UE receives the CLI-RS to perform CLI measurement. In this case, the first UE may identify whether ADC saturation occurs upon receiving the CLI-RS. The first UE may transmit a report message including the CLI measurement result (i.e., CLI measurement information) to the base station. Upon identifying ADC saturation in operation 1205, the first UE may include information indicating the ADC saturation in the report message. According to the example of FIG. 12, it is possible to reduce signaling overhead for CLI measurement. As an alternative embodiment, in the example of FIG. 12, it is also possible to perform CLI measurement using a normal UL signal instead of the CLI-RS.

Figure 13:
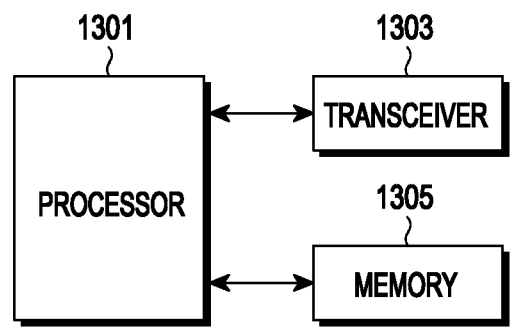
FIG. 13 is a view illustrating an example of a configuration of a network entity in a wireless communication system according to an embodiment of the disclosure.

FIG. 13 is a view illustrating an example of a configuration of a network entity in a wireless communication system according to an embodiment of the disclosure. The network entity of FIG. 13 may be one of the first UE, the second UE, and the base station described in connection with the embodiments of FIGS. 1A to 1D, 2A, 2B, 3, 4A to 4C, 5, 6, 7A to 7C, and 8 to 12.

Referring to FIG. 13, the network entity may include a processor 1301 controlling the overall operation of the network entity, a transceiver 1303 including a transmitter and a receiver, and a memory 1305. Without limited thereto, the network entity may include more or less components than those shown in FIG. 13.

According to an embodiment of the disclosure, the transceiver 1303 may transmit/receive signals to/from at least one of other network entities or a UE. The transmitted/received signals may include at least one of control information and data. When the network entity of FIG. 13 is a core network entity, signals transmitted/received between the network entity and the UE may be transmitted/received via the RAN.

According to an embodiment of the disclosure, the processor 1301 may control the overall operation of the network entity to perform operations according to a combination of one or more of the embodiments of FIGS. 1A to 1D, 2A, 2B, 3, 4A to 4C, 5, 6, 7A to 7C, and 8 to 12 described above. The processor 1301, the transceiver 1303, and the memory 1305 are not necessarily implemented in separate modules but rather as one component, such as a single chip. The processor 1301 may be an application processor (AP), a communication processor (CP), a circuit, an application-specific circuit, or at least one processor. The transceiver 1303 may include at least one communication interface for wiredly/wirelessly transmitting/receiving signals to/from another network entity.

According to an embodiment of the disclosure, the memory 1305 may store a default program for operating the network entity, application programs, and data, such as configuration information. The memory 1305 provides the stored data according to a request of the processor 1301. The memory 1305 may include a storage medium, such as ROM, RAM, hard disk, CD-ROM, and DVD, or a combination of storage media. There may be provided a plurality of memories 1305. The processor 1301 may perform at least one of the above-described embodiments based on a program for performing operations according to at least one of the above-described embodiments stored in the memory 1305.

Figure 14:
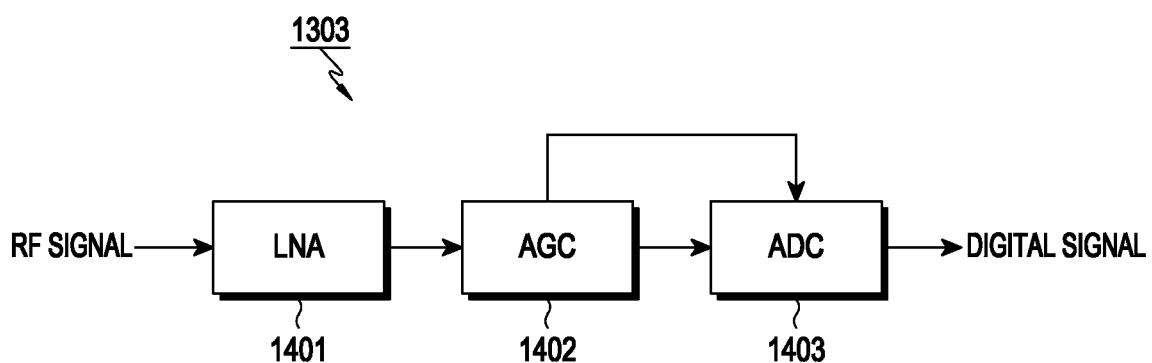
FIG. 14 is a view illustrating an example of a configuration of an AGC-related device included in a transceiver in the network entity of FIG. 13 according to an embodiment of the disclosure.

FIG. 14 is a view illustrating an example of a configuration of an AGC-related device included in a transceiver 1303 in the network entity of FIG. 13 according to an embodiment of the disclosure.

Referring to FIG. 14, the AGC-related device includes a low noise amplifier 1401 receiving, amplifying, and outputting a radio frequency (RF) signal, an AGC 1402 increasing or decreasing the gain (power level) of the reception signal so that the reception signal is input within an input range of an ADC 1403, and the ADC 1403 converting an analog input signal into a digital signal and outputting the digital signal. Referring to FIG. 13, the processor 1301 may control the operation of the AGC 1402 to perform the AGC tuning operation described in connection with the embodiments of the disclosure.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a wireless communication system in which cross-link interference (CLI) exists, the method comprising:
   receiving, from a base station, control information related to automatic gain control (AGC) tuning and CLI measurement;
   receiving, from a second UE, a first signal for the AGC tuning based on the control information;
   controlling an input signal level of an analog-to-digital converter (ADC) in the first UE based on the first signal;
   receiving, from the second UE, a second signal for the CLI measurement based on the control information; and
   transmitting, to the base station, a report message comprising a CLI measurement result measured based on the second signal.

2. The method of claim 1,
   wherein the first signal is one of a cross-link interference-reference signal (CLI-RS), a signal for AGC tuning, or a normal uplink (UL) signal, and
   wherein the second signal is one of a CLI-RS or a normal UL signal.

3. The method of claim 1,
   wherein the first signal and the second signal are received in a symbol position pre-configured in a slot, and
   wherein the control information comprises information related to the symbol position.

4. The method of claim 1, wherein the first signal and the second signal have the same power level.

5. The method of claim 1, further comprising:
   receiving, from the base station, resource allocation information in a frequency domain and a time domain for a resource set comprising specific resources where the first signal and the second signal are received, wherein the control information comprises information indicating the specific resources in the resource set.

6. A first user equipment (UE) in a wireless communication system in which cross-link interference (CLI) exists, the first UE comprising:
a transceiver; and
at least one processor configured to:
receive, via the transceiver from a base station, control information related to automatic gain control (AGC) tuning and CLI measurement,
receive, via the transceiver from a second UE, a first signal for the AGC tuning based on the control information,
control an input signal level of an analog-to-digital converter (ADC) in the first UE based on the first signal,
receive, via the transceiver from the second UE, a second signal for the CLI measurement based on the control information, and
transmit, to the base station via the transceiver, a report message comprising a CLI measurement result measured based on the second signal.

7. The first UE of claim 6,
wherein the first signal is one of a cross-link interference-reference signal (CLI-RS), a signal for AGC tuning, or a normal uplink (UL) signal, and
wherein the second signal is one of a CLI-RS or a normal UL signal.

8. The first UE of claim 6,
wherein the first signal and the second signal are received in a symbol position pre-configured in a slot, and
wherein the control information comprises information related to the symbol position.

9. The first UE of claim 6, wherein the first signal and the second signal have the same power level.

10. The first UE of claim 6,
wherein the at least one processor is further configured to receive, via the transceiver from the base station, resource allocation information in a frequency domain and a time domain for a resource set comprising specific resources where the first signal and the second signal are received, and
wherein the control information comprises information indicating the specific resources in the resource set.

11. A method performed by a base station in a wireless communication system in which cross-link interference (CLI) exists, the method comprising:
transmitting, to a first user equipment (UE), first control information related to at least one of automatic gain control (AGC) tuning or CLI measurement;
transmitting, to a second UE, second control information related to transmission of at least one of a first signal for the AGC tuning or a second signal for the CLI measurement; and
receiving, from the first UE, a report message comprising a CLI measurement result based on the second signal.

12. The method of claim 11,
wherein the first signal is one of a cross-link interference-reference signal (CLI-RS), a signal for AGC tuning, or a normal uplink (UL) signal, and
wherein the second signal is one of a cross-link interference-reference signal (CLI-RS) or a normal UL signal.

13. The method of claim 11,
wherein the first signal and the second signal are transmitted in a symbol position pre-configured in a slot, and
wherein the first control information and the second control information comprise information related to the symbol position.

14. The method of claim 11, wherein the first signal and the second signal have the same transmission power.

15. The method of claim 11, further comprising:
transmitting resource allocation information in a frequency domain and a time domain for a resource set comprising specific resources where the first signal and the second signal are transmitted,
wherein the first control information and the second control information comprise information indicating the specific resources in the resource set.

16. A base station in a wireless communication system in which cross-link interference (CLI) exists, the base station comprising:
a transceiver; and
at least one processor configured to:
transmit, to a first user equipment (UE) via the transceiver, first control information related to at least one of automatic gain control (AGC) tuning or CLI measurement,
transmit, to a second UE via the transceiver, second control information related to transmission of at least one of a first signal for the AGC tuning or a second signal for the CLI measurement, and
receive, via the transceiver from the first UE, a report message including a CLI measurement result based on the second signal.

17. The base station of claim 16,
wherein the first signal is one of a cross-link interference-reference signal (CLI-RS), a signal for AGC tuning, or a normal UL signal, and
wherein the second signal is one of a CLI-RS or a normal UL signal.

18. The base station of claim 16,
wherein the first signal and the second signal are transmitted in a symbol position pre-configured in a slot, and
wherein the first control information and the second control information comprise information related to the symbol position.

19. The base station of claim 16, wherein the first signal and the second signal have the same transmission power.

20. The base station of claim 16,
wherein the at least one processor is further configured to transmit, via the transceiver, resource allocation information in a frequency domain and a time domain for a resource set comprising specific resources where the first signal and the second signal are transmitted, and
wherein the first control information and the second control information comprise information indicating the specific resources in the resource set.

* * * * *